United States Patent [19]

Wang

[11] Patent Number: 5,528,224
[45] Date of Patent: Jun. 18, 1996

[54] OPTICAL AND ACOUSTIC WEATHER IDENTIFICATION SYSTEM

[75] Inventor: Ting-I Wang, Gaithersburg, Md.

[73] Assignee: Scientific Technology, Inc., Gaithersburg, Md.

[21] Appl. No.: 446,007

[22] Filed: May 19, 1995

Related U.S. Application Data

[63] Continuation-in-part of Ser. No. 238,215, May 3, 1994, abandoned.

[51] Int. Cl.⁶ .................................................. G08B 19/02
[52] U.S. Cl. .......................... 340/583; 340/580; 381/122; 250/573; 73/170.17
[58] Field of Search .................................... 340/583, 962, 340/580, 582; 381/122, 56; 73/170.17; 250/573

[56] References Cited

U.S. PATENT DOCUMENTS

| | | | |
|---|---|---|---|
| 3,141,330 | 7/1964 | Murray | 73/170.17 |
| 4,760,272 | 7/1988 | Wang | 250/573 |

FOREIGN PATENT DOCUMENTS

| | | | |
|---|---|---|---|
| 0422553 | 8/1990 | European Pat. Off. | |

Primary Examiner—John K. Peng
Assistant Examiner—Albert K. Wong
Attorney, Agent, or Firm—Charles H. Thomas

[57] ABSTRACT

An optical weather identification system employing a light beam source that transmits a partial coherent beam of light along a prescribed path to detect precipitation and distinguish rain from snow is improved by the provision of another channel that is further able to distinguish solidified precipitation, namely sleet and hail. The additional output is derived from an acoustic, rather than an optical input. An acoustic receiver is positioned at a remote site to be monitored, along with an optical transmitter and receiver. The acoustic receiver employs a microphone located beneath the center of the underside of a domed top of the acoustic receiver casing. Falling precipitation is optically detected using prior optical precipitation detection techniques. However, if the particles of precipitation are solidified, as in the case of sleet and hail, the microphone will detect the impact of the sleet and hail on the domed receiver casing as an audible input. This audible input is combined with the optical inputs indicative of precipitation to produce a separate classification for the precipitation as sleet or hail, in addition to the prior classifications of rain and snow that have heretofore been possible.

15 Claims, 9 Drawing Sheets

OPTICAL AND ACOUSTIC WEATHER IDENTIFICATION SYSTEM

The present application is a continuation-in-part of U.S. application Ser. No. 08/238,215, filed May 3, 1994, now abandoned.

BACKGROUND OF THE INVENTION

1. Field of the Invention

The present invention relates to a system for optically and acoustically detecting ice and sleet pellets in a remote weather monitoring system in which precipitation has been detected.

2. Description of the Prior Art

The primary purposes of automatic weather identification is to provide for remote monitoring of weather without the necessity for human observation at the weather monitoring site. Such a technique allows precipitation conditions at unmanned airfields to be remotely monitored and reported to the pilots of aircraft in flight who may be using those airfields.

A system has previously been devised which provides for remote monitoring of weather without the necessity for human observation at a weather monitoring site in which the presence of precipitation has been detected optically using a partially coherent light beam source. This system is described in my prior U.S. Pat. No. 4,760,272 entitled OPTICAL PRECIPITATION DETECTION AND IDENTIFICATION SYSTEM USING SCINTILLATION DETECTION issued Jul. 26, 1988. That system operates upon the principal that correct identification of different types of precipitation is possible in a near field region which involves transmission of a partially coherent light beam over a path length which is much shorter than that of prior conventional optical systems.

According to the system of my prior patent a partially coherent light source, such as an infrared light emitting diode, transmits a light beam wherein the product of the distance between the transmitter and receiver and one half the angle of incoherency of the partially coherent light beam source is no greater than about 2.5 mm. The distance between the transmitter and the receiver is on the order of about one meter.

Precipitation passing through the light beam produces a characteristic "signature" in frequency of the output of the optical receiver, depending upon whether the precipitation is rain or snow. If the detected precipitation is rain the output frequency of the detected scintillations is above about one kHz. Snow induced frequencies are primarily below a few hundred Hz. The ratio of the quantity of scintillations in the upper band to the quantity in the lower band is used in my prior system to discriminate between rain and snow. That is, rain is indicated when the ratio of scintillations in the high band to the low band is great. Conversely, snow is indicated where the ratio of scintillations in the high band to the low band is small.

One difficulty with my prior system is that it lacks a provision for identifying the presence of ice pellets, such as sleet and hail. The optical scintillations produced by ice pellets typically generate output frequencies in the higher range, and therefore are inaccurately identified as rain by the electronics employed in my prior system.

The National Weather Service requires human observers to separately categorize solidified precipitation, that is sleet or ice pellets, from both rain and snow. However, thus far it has not been possible to remotely make this distinction in prior optical scintillation detection devices. Accordingly, the individuals remotely monitoring the output of the instrumentation have not been provided with information as to whether the precipitation detected at a remote area is solidified, that is, whether or not it is arriving at ground level in the form of ice pellets as sleet or hail.

SUMMARY OF THE INVENTION

The present invention provides a means for remotely and accurately identifying the existence of solidified precipitation, namely ice pellets as hail or sleet, when utilized in conjunction with a system for optically detecting the existence of precipitation at a remote location utilizing electronic instrumentation. According to the invention an acoustic receiver is provided at the remote monitoring site, along with the optical receiver. The acoustic receiver is mounted within a receiver casing having a hard, convex, upwardly facing domed surface. Typically the receiver casing is a completely enclosed metal structure having a roof with a domed surface of aluminum, about 0.08 inches thick. The domed surface preferably has the shape of the surface of a segment of a sphere, preferably comprising at least about one-tenth of the surface area of the sphere.

The acoustic receiver that is located within the receiver casing is positioned directly beneath the center of the domed surface and is sensitive to the audible frequencies generated by the impact of descending solidified precipitation on the domed surface. It is important for the upwardly facing surface of the receiver to be domed, since other surfaces, such as an inclined roof, produce acoustic signals which vary with the direction of the prevailing wind. The use of a round dome shape for the impact surface eliminates any preference in the direction of the falling particles. Therefore, the prevailing wind will not affect the extent to which precipitation particles strike the surface. Furthermore, because the impact surface is domed it will shed precipitation, since a precipitation build-up on the upwardly facing surface would affect the acoustic signals generated.

Preferably, the acoustic receiver is comprised of a simple condenser type microphone that is positioned directly beneath the center of the convex domed top cover or roof of the receiver casing. The microphone allows the acoustic waves produced by impact anywhere against the casing to be detected by the microphone. The microphone is sensitive enough to detect the audible sound of sleet and ice pellets striking the surface of the metal receiver casing.

The electronic signals produced by the microphone are preamplified and transmitted to the signal processing circuitry of the type described in my prior U.S. Pat. No. 4,760,272. The amplified electronic signals from the microphone are processed through a high pass filter which has a threshold of at least about 5.0 kHz, and which preferably has a threshold of about 7.5 kHz to eliminate low frequency ambient noise and to minimize ambiguity between falling ice particles and rain.

When an acoustic signal is detected by the microphone having signals within the frequency band characteristic of falling sleet and ice pellets, there will be an input to the signal processing circuitry which also receives the optically generated signals produced from scintillations that result from passage of precipitation through the partially coherent light beam source. The presence of both an optically generated precipitation signal and an acoustic signal in the proper frequency range very accurately informs the remote observer that the precipitation detected is solidified precipitation, namely ice pellets which may be hail or sleet. Thus, the present invention provides an observer with the capability of remotely discriminating between rain, snow, and also sleet and ice pellets in electronic signals indicative of precipitation at a remote site.

The acoustic signal is processed only in conjunction with an optical signal indicative of precipitation. This prevents a false indication of precipitation which would otherwise result from noise produced by nonprecipitation events, such as the impact of blowing sand against the receiver casing, noise from jet engines, passing automotive vehicles, and other ambient noise including even that caused by insects, birds, and animals.

In one broad aspect the present invention may be considered to be an improvement in a weather identification system having a light beam source that transmits a partially coherent beam of light along a prescribed path, an optical receiver positioned directly in the light beam path to produce optical input signals in response to scintillations occurring in the beam of light, and signal processing means for producing one input signal derived from the input produced by the optical receiver characteristic of rain. The signal processing means also produces another output signal derived from the optical signal from the optical receiver characteristic of snow. The improvement is comprised of an audio receiver casing having a hard, convex, upwardly facing domed surface, a microphone located within the audio receiver casing beneath the center of the domed surface for producing an electronic audio input signal to the signal processing means responsive to an acoustic input thereto, and wherein the signal processing means includes high pass frequency filtering means coupled to the microphone so that the signal processing means produces still another output signal derived from the acoustic input which in combination with a concurrent signal from the optical receiver is indicative of impact of solidified precipitation on the hard surface of the audio receiver casing.

In another broad aspect the invention may be considered to be a weather condition indicating system comprising a partially coherent light beam generating transmitter, a photosensitive receiver, an acoustic receiver housing having a hard, convex, upwardly facing domed surface, and an acoustic receiver located in the acoustic receiver housing, first and second preamplifier circuits for the photosensitive receiver and the acoustic receiver, respectively, and a signal processor.

The partially coherent light beam generating transmitter is arranged to transmit a partially coherent beam of light along a linear path. The photosensitive receiver is positioned directly in the path of the beam of light at a predetermined distance therefrom and in optical communication therewith. The first preamplifier circuit is coupled to amplify signals from the first receiver that are generated in response to scintillations occurring in the light beam from the transmitter.

The acoustic receiver is positioned within the acoustic receiver housing to detect the audible impact of solidified precipitation on the hard, upper surface of the housing and to generate electrical signals indicative thereof. The second preamplifier circuit is coupled to amplify the signals from the acoustic receiver. The signal processor separately isolates signals from the optical receiver having frequency characteristics of rain and of snow and also generates an input from the acoustic receiver, in combination with a concurrent optical signal, indicative of impact of solidified precipitation on the hard, upper surface of the acoustic receiver housing.

Since the primary purpose of the acoustic receiver is to separate soft impacts, such as those generated by water drops and snow flakes, from hard impacts, such as those generated by ice pellets and hail. The material of the dome must be selected so as not to have its own oscillation frequencies. In devising an appropriate acoustic receiver, the vibration frequencies of stainless steel, glass, plastic, and aluminum of various thickness was considered. Aluminum metal having a thickness of 0.08 inches produced the least pronounced oscillation frequency and is the material of choice in the fabrication of the domed surface of the receiver housing.

In still another broad aspect the invention may be considered to be a weather identification system comprising a partially coherent light beam source with a first preamplification circuit coupled thereto, an acoustic receiver casing having a vertically upwardly facing, hard, convex, domed surface, an acoustic receiver located in the acoustic receiver casing vertically beneath the center of the domed surface, a second preamplification circuit coupled to the acoustic receiver, and a signal processing means.

The partially coherent light beam source is arranged to transmit a beam of light along a linear path. The photosensitive receiver is positioned directly in the path of the beam of light a predetermined distance from the partially coherent light beam source and in direct optical communication therewith to produce electronic signals in response to scintillations caused by particle movement between the source and the photosensitive receiver. The acoustic receiver provides an electronic output indicative of sound produced by solidified pellets of precipitation striking the hard, upper surface of the receiver casing.

The signal processing means is coupled to both the first and second preamplification circuits. The signal processing means produces first, second, and third outputs. The first output has a frequency range characteristic of rain. The second output has a frequency range characteristic of snow. The third output is a signal derived from at least one of the first and second outputs and also from the second preamplification circuit and is indicative of solidified precipitation.

Preferably the receiver casing that houses the acoustic receiver is a domed metal structure that is mounted on a boom that extends laterally from the top of the casing housing the signal processor. A domed roof casing is seated atop and completely covers a flat, disc-shaped base plate and seats upon a groove in the base plate that is filled with a waterproof sealant. A disc-shaped layer of insulating foam is positioned atop the base plate to provide a layer of acoustic isolation from the rest of the system.

A condenser microphone is located at the center of the base plate. Leads from the condenser microphone pass through an opening in the floor of the base plate and a cable carrying these leads passes from the receiver casing downwardly and up through the bottom of the signal processor housing for coupling to the signal processor.

The roof of the receiver casing is a convex dome so that liquid precipitation will not collect on the roof and deaden the sound of impacting hail or sleet. Also, to prevent snow accumulation on the top of the receiver casing, an annular heating coil controlled by a thermostat is also preferably provided. The heating coil is disposed about the periphery of the underside of the domed roof of the acoustic receiver casing and resides atop the insulating foam pad. The heater is operated from a positive 24 volt DC power supply.

The signal processing circuitry includes a channel designed to amplify and filter the microphone signal. An SP2 high channel printed circuit board of the system of U.S. Pat. No. 4,760,272 is modified and is plugged into a spare slot in the card cage for that system. Sensitivity and frequency response for the acoustic circuitry were determined empirically. A 7.5 kHz high pass filter is used to reject background noises generated by jets, ground vehicles, wind, and other manmade or natural noises, and also to minimize ambiguity between rain and ice particles.

The invention may be described with greater clarity and particularity with reference to the accompanying drawings.

DESCRIPTION OF THE EMBODIMENT

Figure 1:
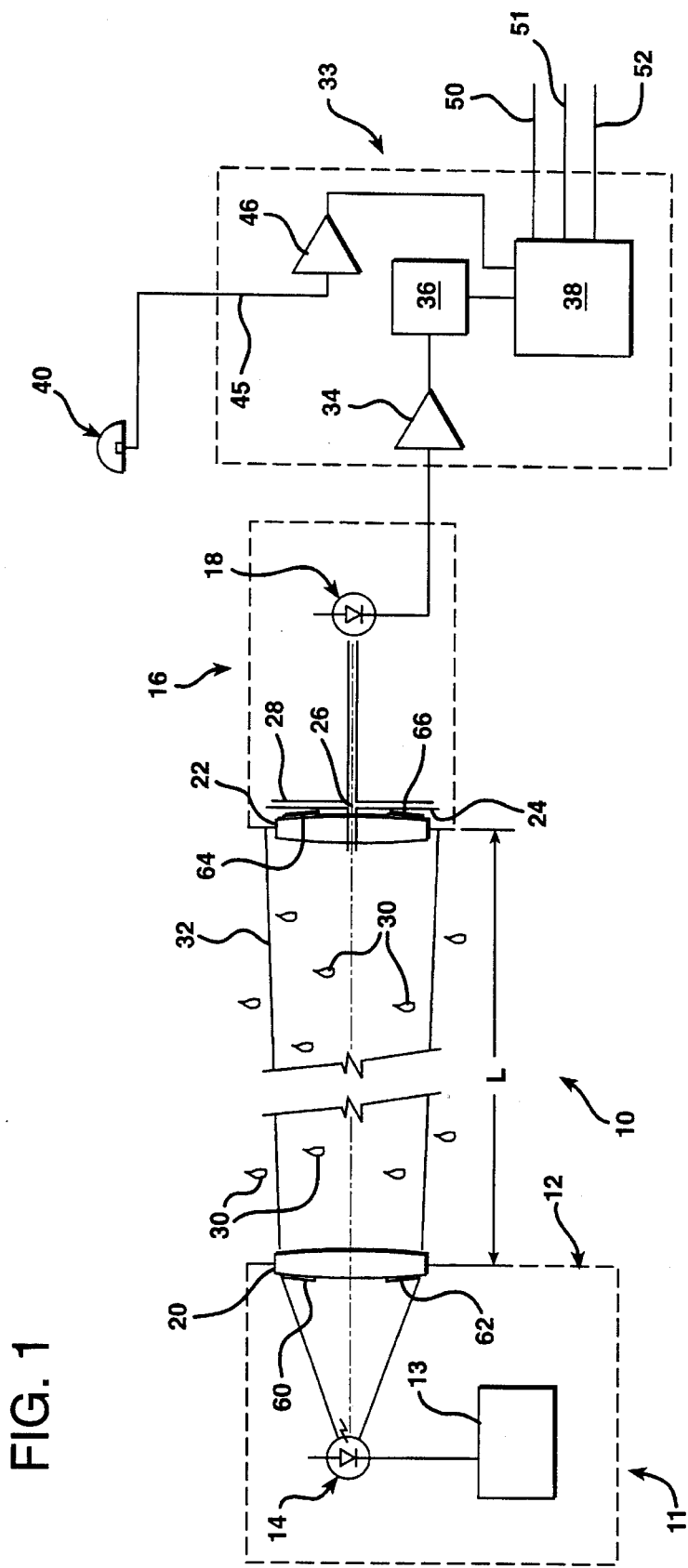
FIG. 1 is a functional block diagram of a preferred embodiment of a weather identification system according to the invention.
Figure 2:
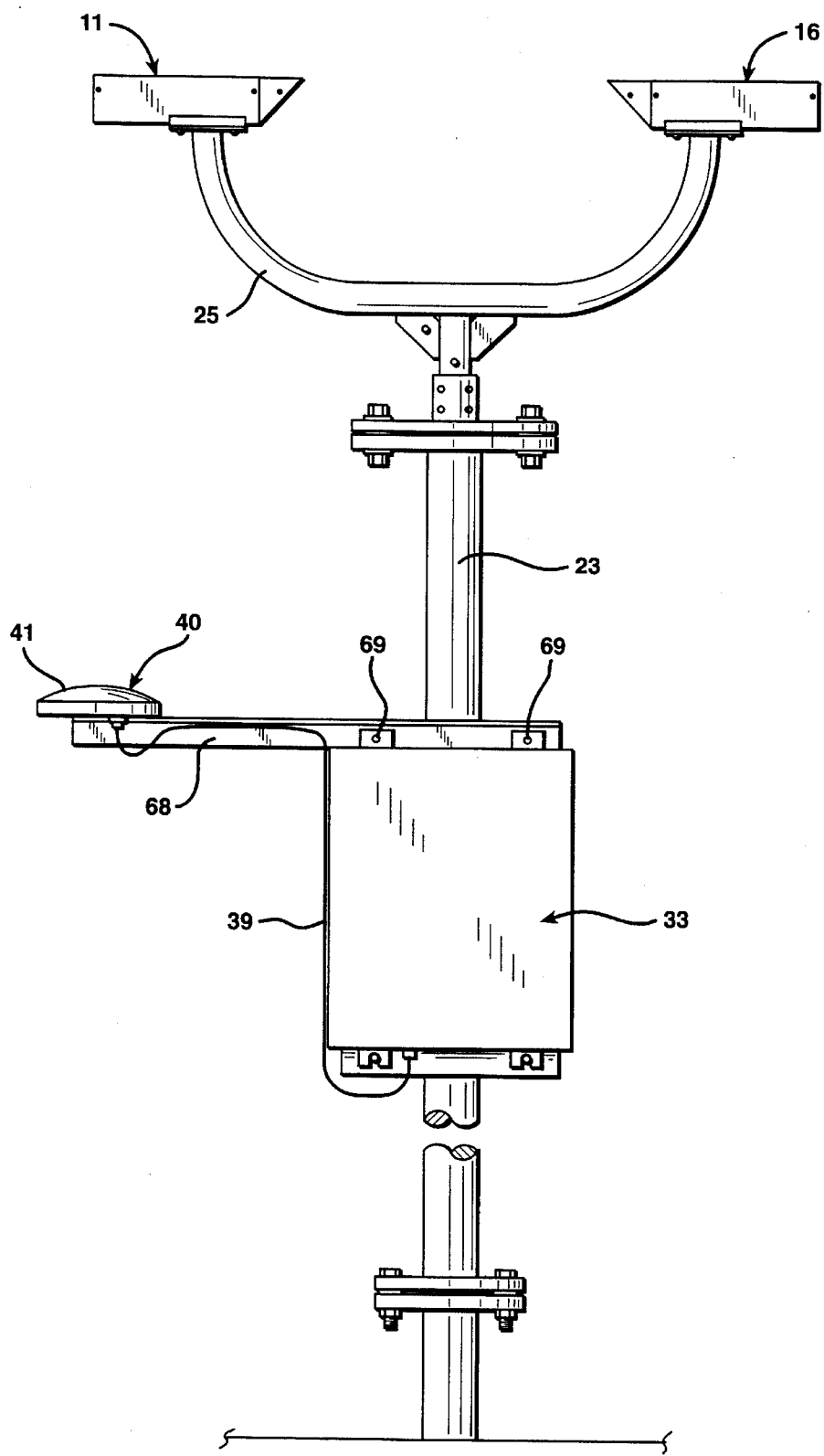
FIG. 2 is a elevational view illustrating the physical configuration of the weather identification system of FIG. 1.

FIG. 1 is a functional block diagram illustrating a preferred embodiment of the weather condition indicating system of the invention, indicated generally at 10. The weather identification system 10 includes an optical transmitter 11 and a photosensitive receiver 16 mounted on opposite ends of a common transversely oriented boom 25, as shown in FIG. 2. The boom 25 in turn is supported at the top of a vertical mast 25 that is mounted in the ground.

The transmitter 11 includes both a power supply (not depicted) and a generally coherent light beam source indicated generally at 12 and employing an infrared light emitting diode (IRED) 14. The transmitter 11 employs an IRED modulator 13 which drives the IRED 14. The photosensitive receiver 16 is housed within a metal casing indicated at 33. The photosensitive receiver 16 employs a PIN photodiode 18. The light beam source 12 of the transmitter 11 includes a 175 millimeter achromatic transmitter focusing lens 20 having a focal ratio of F3.5. The photosensitive receiver 16 likewise includes a receiver lens 22, identical to the lens 20 and a mask 24 which defines a horizontal slot 26 one millimeter in height and which is located behind the receiver lens 22. An infrared filter 28 is located behind the mask 24.

The photosensitive receiver 16 is positioned a predetermined distance from the partially coherent light beam source 12 and in optical communication therewith. The photosensitive receiver 16 produces electronic signals in response to scintillations in the infrared light beam 32 that are created by the movement of particles, such as the precipitation particles indicated at 30, as those particles pass through the infrared light beam 32. The photosensitive receiver 16 is positioned directly in the path of the light beam 32 at a predetermined distance from the partially coherent light beam generating transmitter 12, and in direct optical communication therewith. The light beam 32 typically travels a distance on the order of about 1 meter.

The output of the photosensitive receiver 16 is directed to electronic components housed within a box-shaped, weathertight electronics enclosure 33, that is also mounted on the mast 23. A first preamplification circuit 34 is located within the electronics enclosure 33 and is coupled to receive and amplify the signal from the photodiode 18. The electronics enclosure 33 also includes an automatic gain control circuit 36 and a signal processor 38. Except as otherwise indicated herein, the circuitry housed within the electronics enclosure 33 is the same as that depicted and described in U.S. Pat. No. 4,760,272.

According to the improvement of the invention the weather identification system 10 also includes an acoustic receiver casing 40 that is preferably a hollow metal structure having a roof 41 formed with a hard, convex, upwardly facing, domed surface fabricated of sheet metal aluminum 0.08 inches in thickness. The domed surface of the roof 41 is shaped as the surface of a segment of a sphere. Preferably the spherical segment forming the surface 41 is comprised of at least about one-tenth of the area of a sphere. The domed surface of the roof 41 has the surface area of a sphere circumscribed by rotating an angle of about twenty-seven degrees about a vertical axis projecting upwardly through the center of the domed surface of the roof 41. At its periphery the domed surface of the roof 41 curves downwardly to form a circular rim.

Figure 4:
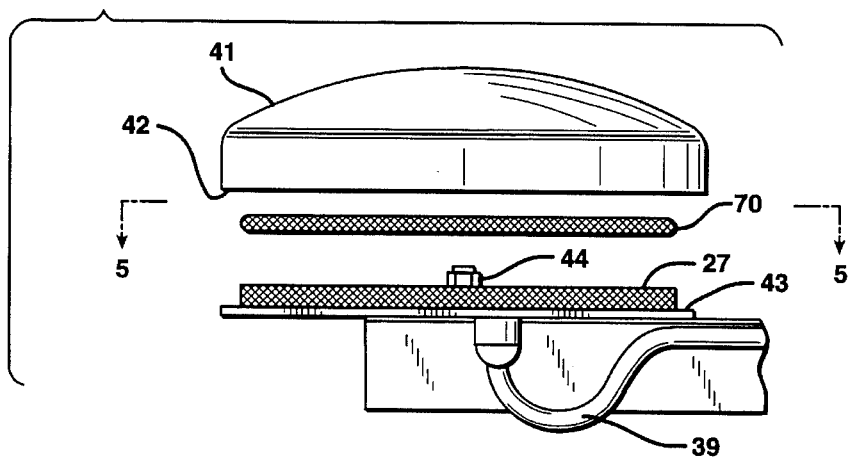
FIG. 4 is an exploded elevational detail showing the acoustic receiver employed in the weather identification system of FIGS. 1–3.

The construction of the acoustic receiver 40 is best illustrated in the exploded view of FIG. 4. As shown in that drawing figure the lower edge 42 of the domed roof 41 has a diameter of about eight inches and is seated on top of a disc-shaped bottom plate 43. The perimeter of the roof surrounds a disc-shaped layer of acoustically insulating foam 27 that resides atop the bottom plate 43. The lower edge 42 of the domed roof 41 is sealed to the bottom plate 43 throughout the entire perimeter of the edge 42 by a moisture-proof adhesive.

An acoustic receiver 44 is located beneath the center of the domed roof 41 atop the insulating foam pad 44 in the enclosure formed beneath the center of the domed roof 41. The acoustic receiver 44 is a simple condenser type microphone which serves as a sensing element for frequencies within the range audible to the human ear. Since the domed roof 41 is formed of metal, the sounds of impinging particles such as those produced by sleet and hail, are readily sensed and transmitted on the acoustic signal line 45 that is carried within a waterproof cable 39. The acoustic output line 45 is connected to a second preamplification circuit 46 that produces an output on line 47.

Figure 3:
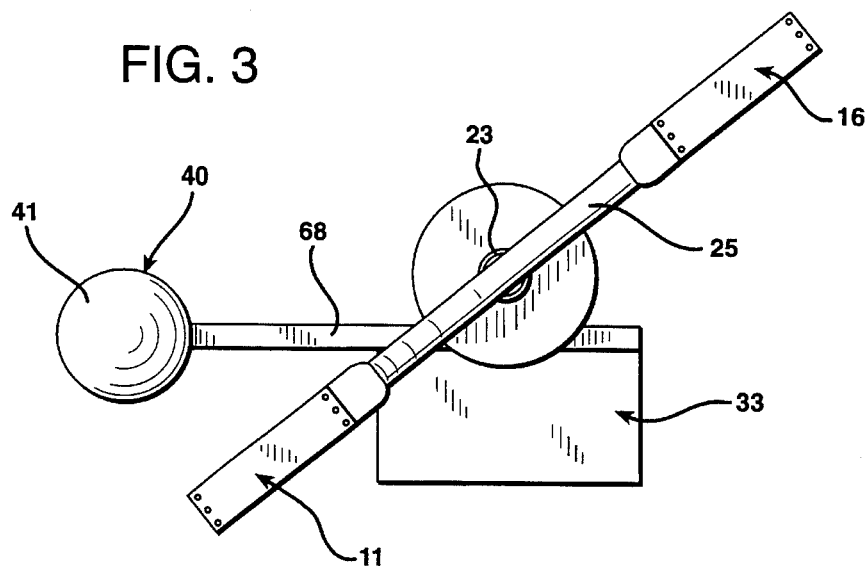
FIG. 3 is a top plan view of the weather identification system shown in FIG. 2.

The acoustic receiver casing 40 is preferably attached to the end of a short boom 68 that extends laterally outwardly from the electronics enclosure 33 and is attached at the top thereof by mounting bolts at 69. The boom 68 is oriented in a direction that extends at a different angle relative to the mast 23 than the boom 25 carrying the transmitter 11 and receiver 12 as best shown in FIG. 3. This angular orientation prevents the transmitter 11 and the receiver 12 from obstructing or interfering with precipitation falling on the domed roof 11.

Figure 5:
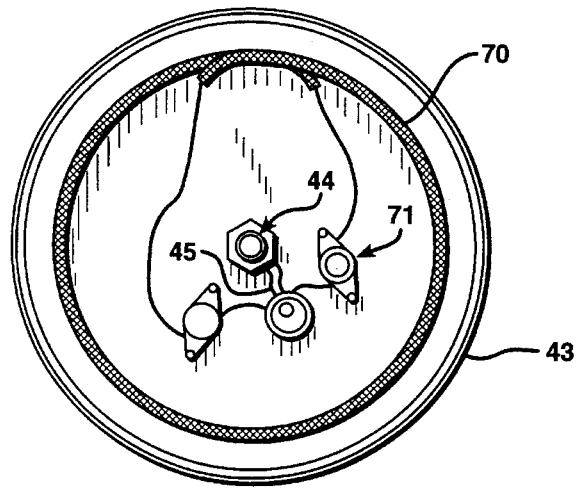
FIG. 5 is a plan view taken along the lines 5—5 of FIG. 4.

As shown in FIG. 5, the acoustic receiver casing 40 also contains an electric heating coil 70 that surrounds the microphone 44 and also rests upon the foam pad 27. The heating coil 70 is controlled by a thermostat 71. The heating coil 70 within the acoustic receiver 40 is operated by a thermostat 71 to maintain the temperature of the domed roof 41 above the ambient freezing point of water, which is zero degrees Centigrade. The heating coil 70 provides heat to melt ice and snow that would otherwise accumulate on the top of the domed roof 41. Because the roof 41 is domed, rain water and melted snow will not accumulate on its upper convex surface, but instead will drain off of the acoustic receiver casing 40. Such accumulations would otherwise tend to deaden the sound of impinging sleet or hail. The heating coil 70 thereby serves to preserve a clean surface for precipitation particle impact.

The heater 70 is connected by an electrical line to a 24 volt DC power supply. The heater line and the acoustic signal line 45 are both protected by the waterproof cable 39 that extends from the acoustic receiver casing 40 and enters into the bottom of the electronics enclosure 33.

The microphone 44 senses acoustic frequencies within the audible range and transmits corresponding electronic audio signals on an acoustic output line 45. The acoustic output line 45 passes through an opening in the floor 43 of the acoustic receiver casing 40 and is protected within the waterproof cable 39, which passes up through the bottom of the electronics enclosure 33, as shown in FIG. 2.

The automatic gain control circuit 36 within the electronics enclosure 33 receives the outputs from both the first and second preamplifiers 34 and 46. The automatic gain control circuit 36 passes the amplified output of the first preamplification circuit 34 to the signal processor 38, while the output of the second preamplification circuit is fed directly to the signal processor 38.

The signal processor 38 produces several outputs. The first output 50 is an electronic signal indicative of receipt of optical scintillations having a frequency range characteristic of rain. A second output 51 of the signal processor 38 is an electronic output indicative of receipt of scintillations having a frequency characteristic of snow. A third output 52 of the signal processor 38 is a signal derived from at least one of the first and second outputs 50 and 51 and from the second preamplification circuit 46. The output 52 is indicative of solidified precipitation. Thus, the outputs 50, 51, and 52 respectively indicate the existence and quantity of rain, snow, and frozen ice pellets such as sleet or hail.

As described in U.S. Pat. No. 4,760,272, the infrared light emitted from the IRED 14 is collected by the focusing lens 20 to form a partially coherent light beam 32 about 50 mm in diameter. The light beam 32 is pointed toward the receiving lens 22 of the optical receiver 16, which is located about one meter from the transmitting lens 20. The precipitation particles 30 falling through the beam 32 will modulate the beam 32 to cause scintillations in the received light signal.

The optical assembly of the optical receiver 16 employs a mask 24 having a horizontal line aperture 26 so as to gain sensitivity to the vertical motion of the precipitation particles 30 as they pass through the beam 32. The modulated light from the transmitter 11 is detected by the PIN photodiode 18 which is coupled to the preamplifier 34 and the automatic gain control circuit 36. The automatic gain control circuit 36 acts as a normalizer to overcome the problems associated with received power fluctuations caused by temperature change, component aging, dust on the lenses 20 and 22, and the obscuring effects of fog or haze. The output of the automatic gain control circuit 36 is demodulated and passed to the signal processor 38.

Because the transmitter light source 12 and photosensitive receiver module 16 are exposed to ambient weather conditions, it is extremely important to the proper operation of the system for both of the lenses 20 and 22 to be free of condensed water and frost. For this purpose, thermofoil heaters are bonded to the inside of each lens. The transmitter heaters are indicated as 60 and 62 while the receiver heaters are indicated at 64 and 66. Since light is transmitted from the receiver lens 22 only through the narrow horizontal slot 26, the heaters 62 and 66 can cover all but a half inch horizontal strip through the center of each of the lenses 20 and 22. The heaters 60–64 are of the type described in U.S. Pat. No. 4,760,272. The heaters 60–64 are all operated from the same 24 volt power supply.

Figure 6:
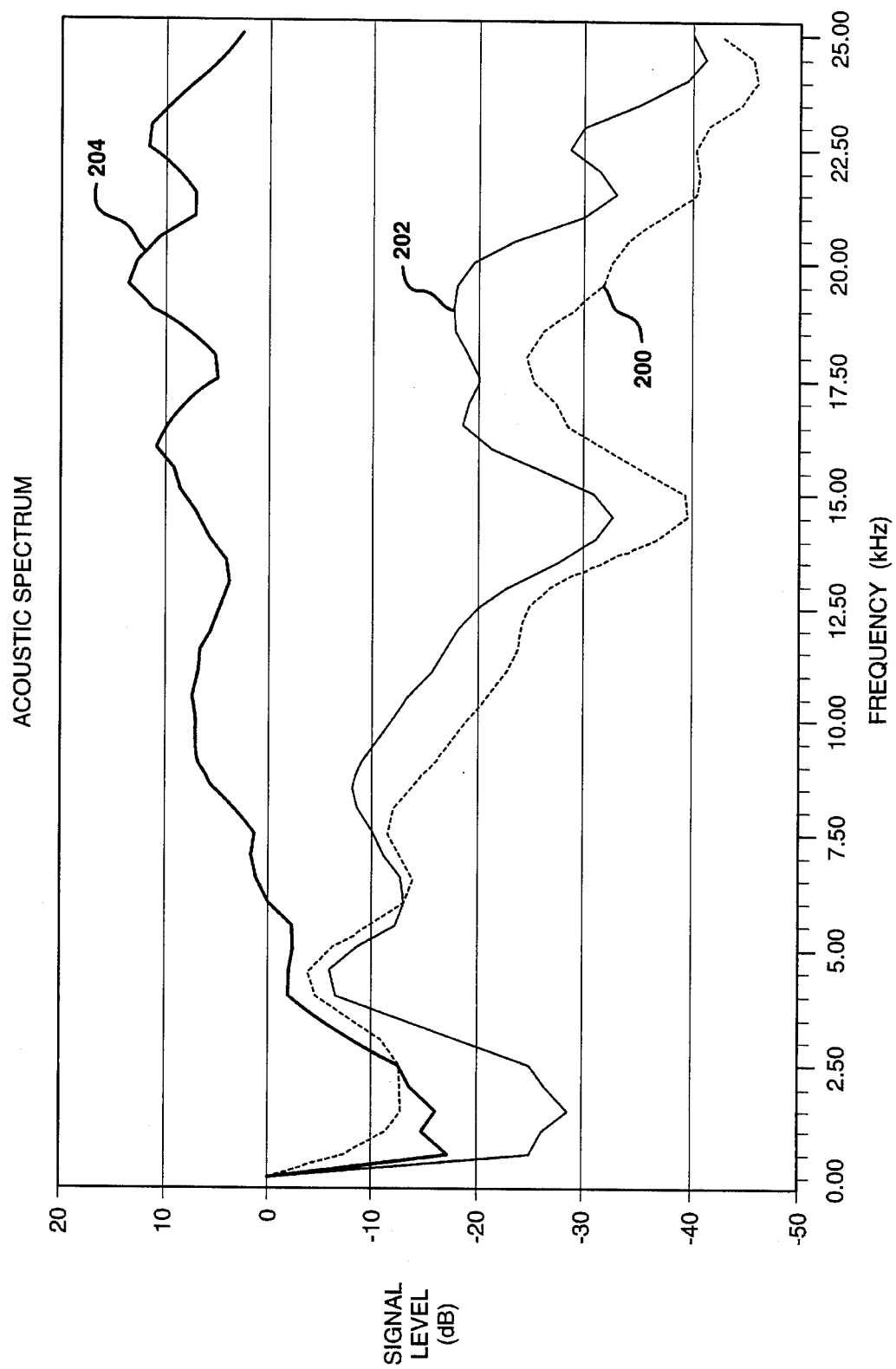
FIG. 6 is a graph of the acoustic temporal power spectrum showing the distinction between electrical signals produced by falling water and ice.

FIG. 6 indicates the acoustic temporal power spectra induced by the domed surface of the roof 41 of the acoustic receiving casing 40 when it is subjected to impacts from precipitation. The tracing 200 illustrates the frequency components when the domed roof 41 is impacted by water droplets. The tracing 202 illustrates the acoustic spectra when the roof 41 is impacted by solid beads, which simulate ice and sleet pellets. The difference of the two spectra tracings 200 and 202 is shown by the tracing 204. As is evident, the induced spectrum 202 from solid particulates has more high frequency components beginning at about 5.0 kHz, and particularly above around 7.5 kHz than the spectrum 200 from water droplets. Therefore, the system employs a high pass filter that is designed for a cutoff threshold frequency of around 7.5 kHz.

Figure 7:
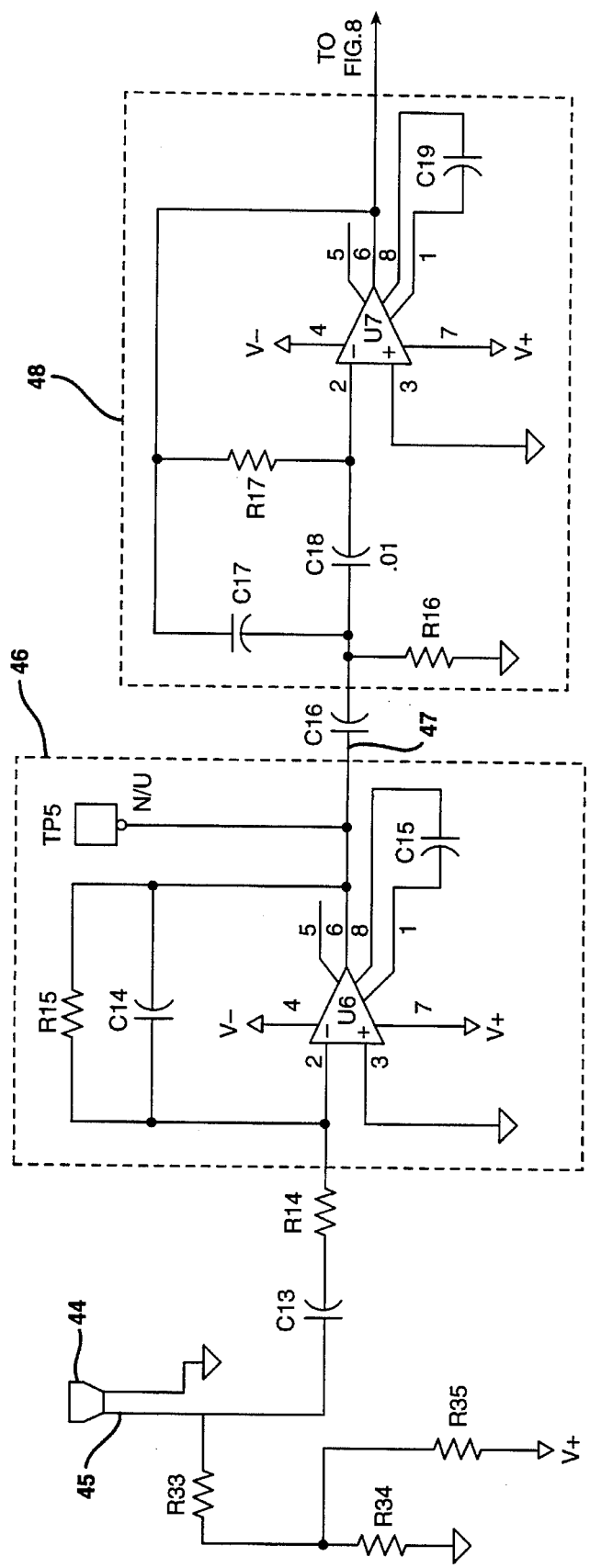
FIG. 7 is an electrical schematic diagram of a portion of the acoustic receiver circuitry of FIG. 1.
Figure 8:
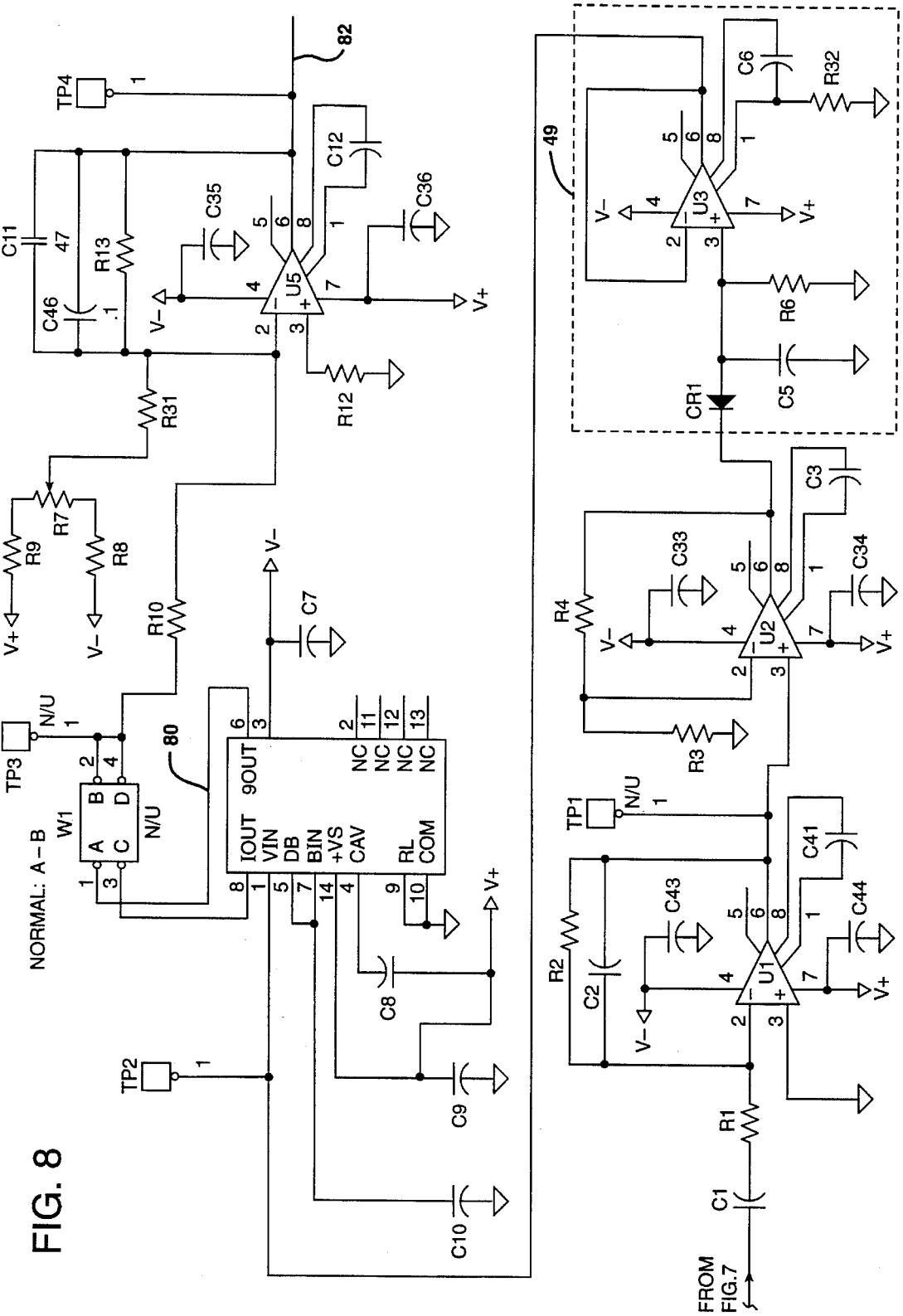
FIG. 8 is a schematic diagram illustrating the remaining portion of the acoustic receiver circuitry employed in the embodiment of FIG. 1.
Figure 9:
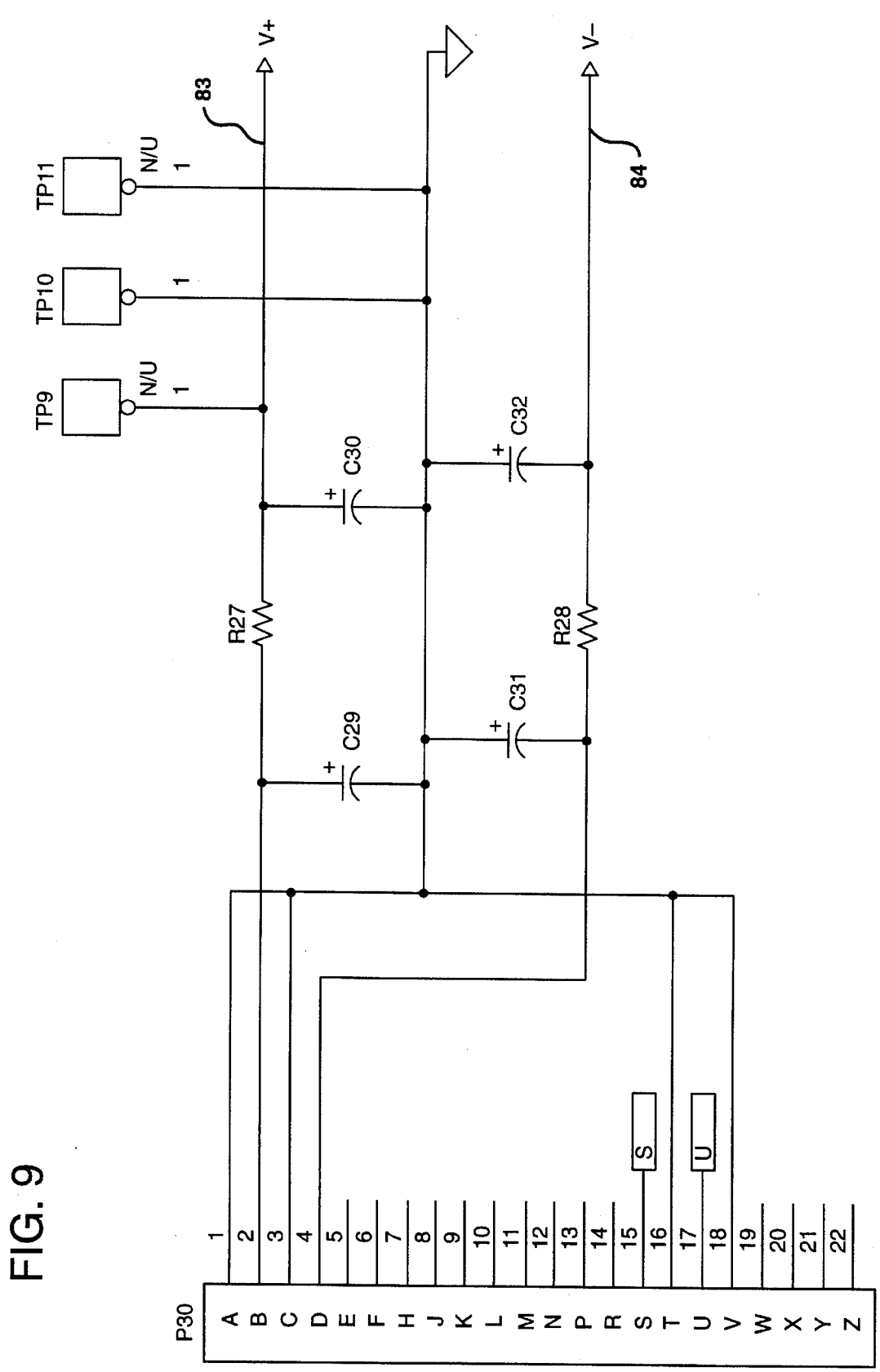
FIG. 9 is a schematic diagram of the direct current power supply employed to drive the acoustic receiver circuitry of FIGS. 7 and 8.

The electronic circuitry for amplifying and filtering the acoustic signal from line 45 is depicted in FIGS. 7, 8, and 9. The values and component identifications for these circuit elements depicted in these drawing figures are listed in Table 1. The designations "TP" indicate test points, while the line numbers to the operating components indicate the pin numbers of those components. The electronic components for processing the optical signals from the optical receiver 16 are same as those described in U.S. Pat. No. 4,760,272.

As shown in FIG. 7, one side of the condenser microphone 44 is grounded while the other side produces a signal on line 45. The raw electrical audio signal indicative of acoustic input on line 45 is biased by the resistor network formed by resistors R33, R34, and R35 and is directed through an alternating current coupling capacitor C13. The capacitor C13 passes only alternating current through a resistor R14 to the second preamplification circuit 46. The preamplification circuit 46 produces an output signal on line 47 that is filtered by the second order high pass filtering network 48.

The high pass filtering network 48 blocks inputs from the audio signal line 45 that are below a threshold frequency, which should be at least 5.0 kHz and is preferably at least about 7.5 kHz. The gain of the high pass filtering network is −1. The high pass filter network 48 is quite important, since it is necessary to exclude low frequency ambient noise which is likely to be present. Such low frequency noise is often detected as sound from ground service vehicles, vehicles on nearby roads and highways, and also most human conversation. The filtering network 48 is responsible for the majority of the filtering of the acoustic signal.

Figure 10:
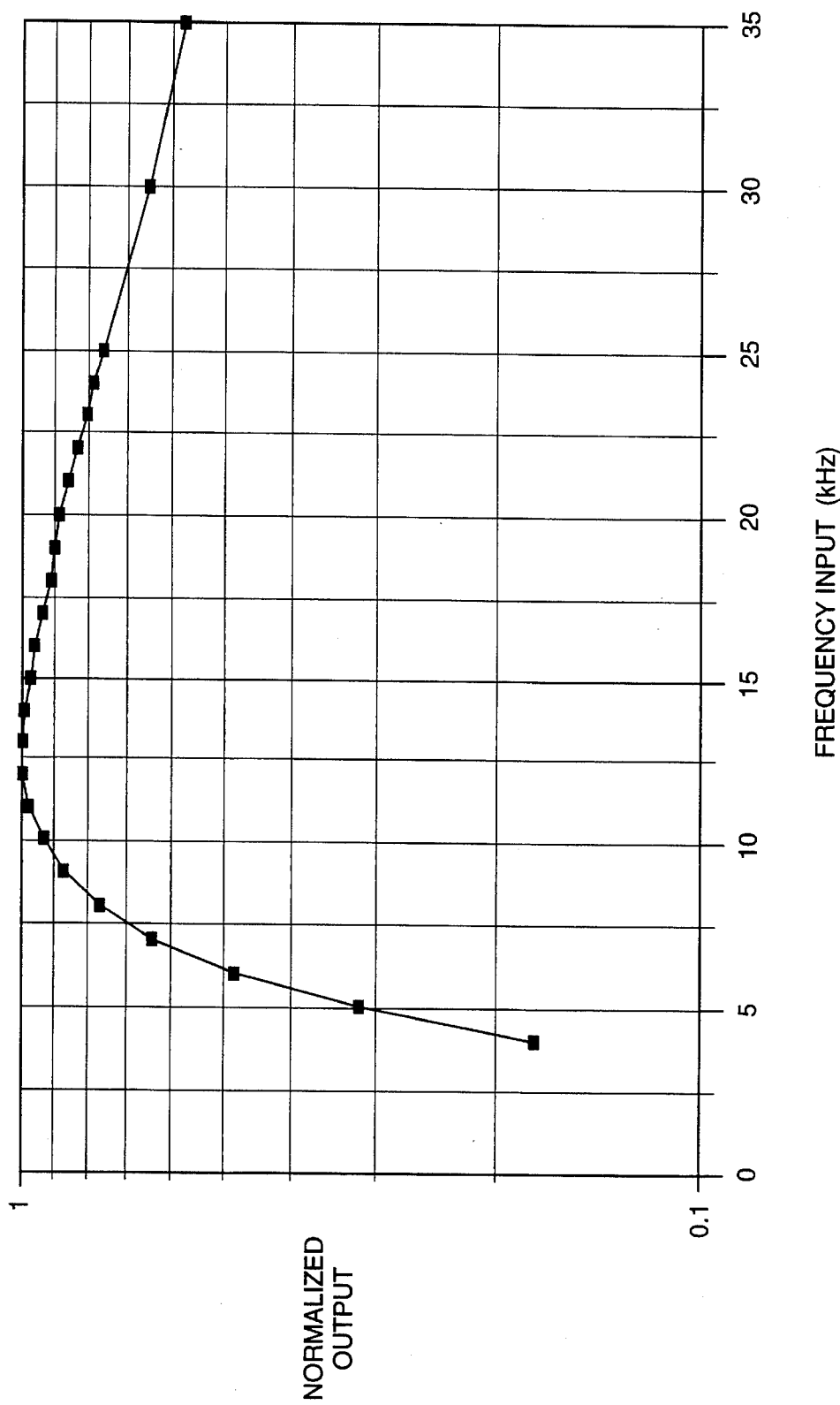
FIG. 10 is a plot of the filter function on the output signal produced from the first and second preamplification circuits and from the acoustic input in the circuitry of FIGS. 7 and 8.

From the high pass filter network 48 the amplified audio signal is passed to a further amplification stage in FIG. 8 that includes an operational amplifier U1 and its associated resistors and capacitors. The amplified signal from operational amplifier U1 is directed as an input to another operational amplifier U2, which amplifies the signal still further. The normalized output of the filter function from the input on line 45 to the output signal from amplifier U2 is graphically illustrated in FIG. 10.

The amplified signal is then directed to a peak holding circuit indicated generally at 49 where the diode CR1 rectifies the signal. The peak holding circuit 49 employs an operational amplifier U3, the input of which has a capacitor C5 and a resistor R6 selected to create a desired time constant. Preferably, the time constant is 0.3 seconds. Therefore, the output of operational amplifier U3 will produce a signal lasting 0.3 seconds and corresponding to the average value of the input to circuit 49.

The output of the peak holding circuit 49 is then directed to an RMS (root mean square) to DC converter circuit employing the chip U4. The RMS circuit U4 produces an output on line 80 which is a logarithmic output of the averaged signal. The output from line 80 is directed to a temperature compensating resister R10 that operates to stabilize temperature drift of the RMS circuit U4.

The operational amplifier U5 is the operating component of another gain stage that receives the log output from the RMS circuit U4. An adjustable resister R7 is employed to adjust the bias of the input signal to the gain stage amplifier U5. The last stage amplifier U5 sets the output gain and offset and outputs at TP4. Laboratory tests indicate that the outputs at TP4 awe 0.5 volts and 2.5 volts for water droplets and simulated ice pellets respectively. Since the output of TP4 is logarithmic, a difference of two volts indicates a factor of 100 between the water droplets and the acoustic signals induced by simulated ice pellets. This difference demonstrates that the system reliably separates rain droplets and ice pellets. Hail stones and snow flakes show an even larger difference.

The amplified signal on line 82 is then directed to the same microprocessor employed in the signal processing circuit 38 described in U.S. Pat. No. 4,760,272 and depicted in FIG. 1 of the present application. The processing of the acoustic signal from this point on is the same as the processing of the optical scintillation signals described in U.S. Pat. No. 4,760,272. Specifically, the output on line 82 is processed as an analog signal and is converted to a digital signal in the same manner as the inputs produced from the optical receiver 16 as described in U.S. Pat. No. 4,760,262.

The weather identification system of that prior patent was able to distinguish only between rain and snow. Often solidified precipitation such as sleet and hail was an ambiguous type of precipitation which would frequently be identified as rain, though sometimes as snow, depending upon the strength of the precipitation.

In the present invention, however, the signal processor 38 is able to produce an output on line 52 that represents the concurrent presence of either a signal indicative of rain on line 50 or a signal indicative of snow on line 51, or both, plus a signal from the microphone 44 on line 45. Unless a signal from the microphone 44 is present on line 45, there will be no output on the solidified precipitation channel indicator line 52. Also, unless there is an optical signal from the photosensitive receiver 16 as processed through the automatic gain control circuit 36, there will likewise be no output on line 52. This arrangement prevents false indications that might otherwise arise from blowing sand, jet engines, passing vehicles, other debris or even insects and animals. With the combination of both the optical and acoustic signals these types of signal contamination can be eliminated.

The microprocessor in the signal processing circuit 38 produces an output on line 52 indicative of ice pellets upon concurrent receipt of a processed audio signal on line 82 and receipt of a signal on line 50 indicative of rain, on line 51 indicative of snow, or on both lines 50 and 51. The generation of the rain and snow indicating signals on lines 50 and 51 is described in U.S. Pat. No. 4,760,272.

FIG. 9 illustrates the direct current power supply that produces the positive 12 volt supply on line 83 and the negative 12 volt supply on line 84 that is used to power the circuitry of FIGS. 3 and 4. The circuit of FIG. 9 employs condenser and capacitors which serve as a stabilizer and condenser to maintain uniform DC voltage outputs on lines 83 and 84.

Figure 11:
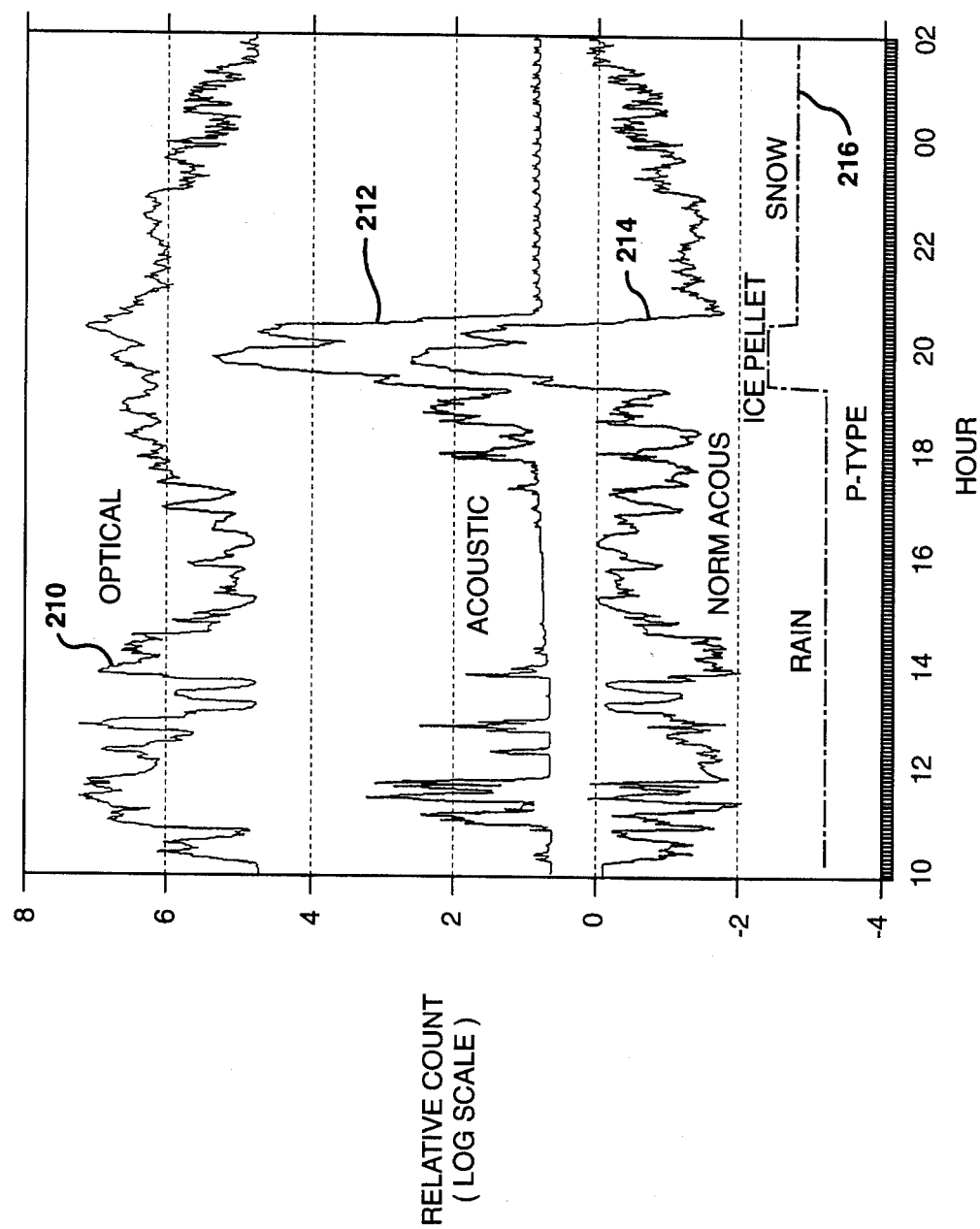
FIG. 11 shows pen recorder tracings of precipitation distinguishing outputs from the circuitry of FIGS. 7 and 8 produced by an actual event that started as rain, switched to ice pellets, and finally changed to snow.

A prototype of the weather identification system 10 was actually field tested during a meteorological event that started with rain, then switched to ice pellets, and finally changed to snow. The results of this field test are illustrated in FIG. 11. The trace of the optical signal from the optical receiver 16 as processed within the signal processor 38 is indicated at 210. The acoustic signal on line 45 is shown by the trace 212. The normalized acoustic signal is indicated by the trace 214.

As is evident, the normalized acoustic signal 214 is a clear indication of the existence of ice pellets between the hours of 19:17 to 20:29. By processing the signal using both optical and acoustic channels, the different types of weather can be reliably identified. The resulting precipitation type is shown at the bottom of FIG. 11 as the trace 216. The results shown by the trace 216 closely follow actual ground observation recorded by a human observer. Without the acoustic channel, the ice pellets clearly revealed in the trace 216 would have been identified as either or snow using prior optical weather identification systems.

Undoubtedly, numerous variations and modifications of the invention will become readily apparent to those familiar with conventional optical weather identification systems. Accordingly, the scope of the invention should not be construed as limited to this specific embodiment depicted and described herein.

TABLE 1

| | |
|---|---|
| U1, U2, U3, U5, U6, U7 | LM101 |
| U4 | AD536 |
| CR1 | IN270 |
| R1, R14 | 34.6K Ohm |
| R2, R13, R15, R31 | 221K Ohm |
| R3, R34 | 10K Ohm |
| R4 | 20K Ohm |
| R5 | 0 |
| R6 | 30.1K Ohm |
| R7 | 50K Ohm |

TABLE 1-continued

| | |
|---|---|
| R8 | 110K Ohm |
| R9 | 60.4K Ohm |
| R10 | 6.5K Ohm, TCR |
| R12 | 3.01K Ohm |
| R16 | 1.0K Ohm |
| R17 | 4.5K Ohm |
| R35 | 15.8K Ohm |
| R27, R28 | 2.2 Ohm, 2 Watts |
| R32 | 10M Ohm |
| R33 | 1K Ohm |
| C1, C13 | .001 microfarad |
| C2, C3, C14, C15, C41 | 18 pf |
| C6 | 100 pf |
| C19 | 15 pf |
| C5 | 10 microfarad |
| C7, C9, C10, C33, C34, C35, C36, C43, C44, C46 | .1 microfarad |
| C8 | 10 microfarad |
| C12 | 330 pf |
| C16, C17, C18 | .01 microfarad |
| C29, C30, C31, C32 | 100 microfarad |
| C49, C11 | 47 microfarad |

I claim:

1. In a weather identification system having a light beam source that transmits a partially coherent beam of light along a prescribed path, an optical receiver positioned directly in said light beam path to produce optical input signals in response to scintillations occurring in said beam of light, and signal processing means for producing one output signal derived from said optical input signals produced by said optical receiver characteristic of rain and another output signal derived from said optical input signals from said optical receiver characteristic of snow, the improvement comprising: an audio receiver casing having a hard, convex, upwardly facing domed surface, a microphone located within said audio receiver casing beneath the center of said domed surface for producing an electronic audio input signal to said signal processing means responsive to an acoustic input thereto created by impact of precipitation on said hard surface of said audio receiver casing, and high pass frequency filtering means having a lower threshold of at least about 5.0 kHz located within said signal processing means coupled to said microphone so that said signal processing means thereby produces still another output signal derived from said acoustic input which in combination with a concurrent optical signal from said optical receiver is indicative of impact of solidified precipitation on said hard surface of said audio receiver casing.

2. A weather identification system according to claim 1 wherein said domed surface has the shape of the surface of a segment of a sphere.

3. A weather identification system according to claim 2 wherein the area of said segment is comprised of at least about one-tenth of the area of said sphere.

4. A weather identification system according to claim 2 further comprising a heater for heating said domed surface to a temperature above zero degrees Centigrade.

5. A weather identification system according to claim 1 wherein said high pass frequency filtering means blocks inputs from frequencies below about 7.5 kilohertz.

6. A weather condition indicating system comprising: a partially coherent light beam generating transmitter arranged to transmit a partially coherent beam of light along a linear path; a photosensitive receiver positioned directly in said path of said beam of light at a predetermined distance from said transmitter and in direct optical communication therewith; a first preamplifier circuit coupled to amplify signals from said photosensitive receiver generated in response to scintillations occurring in said light beam received from said transmitter; an acoustic receiver housing having a convex, upwardly facing, hard, domed surface; an acoustic receiver located in said acoustic receiver housing beneath the center of said domed surface and positioned to detect audible impact of solidified precipitation on said hard, domed surface of said acoustic receiver housing and to generate electrical signals indicative thereof; a second preamplifier circuit coupled to amplify signals from said acoustic receiver; and a signal processor means includes a high pass filter with a threshold frequency of at least about 5.0 kHz coupled to said second preamplifier circuit for excluding signals detected by said acoustic receiver below said threshold frequency for separately isolating signals from said optical receiver having frequency characteristics of rain and of snow and from said acoustic receiver which, in combination with a concurrent signal from said optical receiver, is indicative of impact of solidified precipitation on said hard, upper surface of said receiver housing.

7. A weather condition indicating system according to claim 6 wherein said acoustic receiver includes a microphone placed directly beneath the center of said domed surface of said acoustic receiver housing.

8. A weather condition indicating system according to claim 6 wherein said hard, upper surface of said acoustic receiver housing is formed by an aluminum roof having a thickness of 0.08 inches.

9. A weather condition indicating system according to claim 8 further comprising heating means for maintaining said roof at a temperature above the freezing point of water.

10. A weather condition indicting system according to claim 6 wherein said threshold frequency is about 7.5 kilohertz.

11. A weather identification system comprising: a partially coherent light beam source, arranged to transmit a beam of light along a linear path; a photosensitive receiver positioned directly in said path of said beam of light a predetermined distance from said partially coherent light beam source and in direct optical communication therewith to produce electronic signals in response to scintillations caused by particle movement between said source and said photosensitive receiver; a first preamplification circuit coupled to said photosensitive receiver; an acoustic receiver casing having a vertically upwardly facing hard, convex domed surface; an acoustic receiver located in said acoustic receiver casing vertically beneath the center of said domed surface to provide an electronic output indicative of sound produced by solidified pellets of precipitation striking said hard, domed surface of said acoustic receiver casing; a second preamplification circuit coupled to said acoustic receiver; and a signal processing means coupled to said first and second preamplification circuits for producing first, second, and third outputs wherein said first output has a frequency range characteristic of rain, said second output has a frequency range characteristic of snow, and said third output is a signal produced from the combination of a signal from at least one of said first and second outputs and a signal from said second preamplification circuit wherein said third output signal is indicative of solidified precipitation.

12. A weather identification system according to claim 11 wherein said acoustic receiver is comprised of a microphone.

13. A weather identification system according to claim 11 wherein said hard, domed surface of said casing is formed of metal and is shaped as the surface of a segment of a sphere, and said microphone is positioned directly beneath the center of said domed surface.

14. A weather identification system according to claim 13 wherein said domed surface is comprised of at least about one-tenth of the area of said sphere and is formed of aluminum about 0.08 inches in thickness.

15. A weather identification system according to claim 14 wherein said acoustic receiver is comprised of a microphone located directly beneath the center of said domed surface, and further comprising heater means disposed within said acoustic receiver casing for maintaining said domed surface at a temperature above the freezing point of water, a high pass filter with a threshold of about 7.5 kHz coupled to said second preamplifier circuit for excluding signals detected by said acoustic receiver below said threshold.

* * * * *